United States Patent [19]

Sato

[11] Patent Number: 5,757,097

[45] Date of Patent: May 26, 1998

[54] DYNAMIC PRESSURE BEARING DEVICE

[75] Inventor: Kimio Sato, Akishima, Japan

[73] Assignee: Nippon Ferro Fluidics, Tokyo, Japan

[21] Appl. No.: 309,173

[22] Filed: Sep. 20, 1994

[30] Foreign Application Priority Data

Apr. 1, 1994 [JP] Japan ................... 6-099037

[51] Int. Cl.[6] .................... H02K 5/16; F16C 19/00
[52] U.S. Cl. ........................... 310/90; 384/446
[58] Field of Search .................. 310/90, 905; 384/133, 384/446

[56] References Cited

U.S. PATENT DOCUMENTS

| | | |
|---|---|---|
| 3,851,933 | 12/1974 | Jacobson ................... 384/113 |
| 4,630,943 | 12/1986 | Stahl et al. ................ 384/133 |
| 4,694,213 | 9/1987 | Gowda et al. .............. 310/90 |
| 5,323,076 | 6/1994 | Hajec ....................... 310/90 |
| 5,325,066 | 6/1994 | Uno et al. .................. 310/90 |
| 5,367,416 | 11/1994 | Cossette et al. ............ 360/99.08 |
| 5,372,432 | 12/1994 | Ishikawa ................... 384/133 |

Primary Examiner—Clayton E. LaBalle
Attorney, Agent, or Firm—Morrison Law Firm

[57] ABSTRACT

The invention is intended to facilitate surface processing for generation of dynamic pressure and to prevent degradation of the bearing performance due to temperature changes. To this end, a shaft is composed of an axially magnetized magnet and shafts of magnetic material holding the magnet therebetween. The shaft is press-fitted in an insertion hole in a non-magnetic sleeve. Pole pieces are placed on the upper and lower edges of a hole in a motor hub. Clearances defined by the outer peripheral surface of the sleeve and the inner peripheral surface of the motor hub are filled with a magnetic fluid. In order to generate a dynamic pressure in the magnetic fluid, surface processing is applied not to the magnet but to the outer peripheral surface of the sleeve. Further, the thermal expansion coefficient of the sleeve is greater than that of the motor hub.

7 Claims, 3 Drawing Sheets

DYNAMIC PRESSURE BEARING DEVICE

BACKGROUND OF THE INVENTION

This invention relates to a dynamic pressure bearing device used in hard disk drives (HDD), polygon mirrors and the like.

FIG. 5 is a sectional view of a conventional dynamic pressure bearing device of this type. Disposed on the inner peripheral surface of a motor hub 41 constituting a housing are a cylindrical magnet (permanent magnet) 42 and a pair of cylindrical members 43a and 43b of magnetic material joined to the upper and lower ends of said magnet 42. The magnet 42 is axially magnetized. A cylindrical sleeve 44 of non-magnetic material is disposed on the inner peripheral surfaces of the magnet 42 and cylindrical members 43a and 43b. The sleeve 44 is axially formed with an insertion hole 45, in which a shaft 46 is received for relative rotation. The shaft 46 is made of magnetic material and is provided with a pair of pole pieces 47a and 47b of magnetic material at locations on the shaft 46 above and below the sleeve 44. The pair of pole pieces 47a and 47b are in the form of annular disks and they are positioned in such manner as to define clearances 48a and 48b at the upper and lower sides of the sleeve 44, respectively, and fixed to the shaft 46. Also defined are clearances 49a and 49b between the inner peripheral surfaces of the cylindrical members 43a, 43b and the outer peripheral surfaces of the pole pieces 47a, 47b and a clearance 50 between the outer peripheral surface of the shaft 46 and the inner peripheral surface of the sleeve 44.

A magnetic fluid 51 is enclosed in the clearances 50 and 48a, 48b, and the surfaces which define said clearances 50 and 48a, 48b, i.e., the inner peripheral surface of the insertion hold 45, the outer peripheral surface of the shaft 46, the lower surface of the upper pole piece 47a, and upper surface of the lower pole piece 47b, and the upper and lower surfaces of the sleeve 44 have applied thereto a surface processing which enables the rotation of the motor hub 41 to generate a dynamic pressure in the magnetic fluid 51. That is, a journal bearing is formed between the inner peripheral surface of the sleeve 44 and the outer peripheral surface of the shaft 46, while a thrust bearing is formed by the opposite end surfaces of the sleeve 44 and the inner surfaces of the pole pieces 47a, 47b. Further, said pole pieces 47a, 47b also constitute a sealing section. That is, said magnet 42 forms a magnetic circuit extending successively through the upper cylindrical member 43a, upper pole piece 47a, shaft 46, lower pole piece 47b, and lower cylindrical member 43b and returning to the magnet 42; thus, the magnetic fluid 51 is sealed in the clearances 49a, 49b.

In the conventional dynamic pressure bearing device shown in FIG. 5, the mounting of the magnet 42 outside the bearing makes it difficult to reduce the size of the bearing device and also presents a problem that the number of parts is large. To eliminate these drawbacks, it may be contemplated to employ a dynamic pressure bearing device having a construction shown in FIG. 6.

In the dynamic pressure bearing device shown in FIG. 8, a magnet 52 is disposed at the central axis of a shaft 46, said shaft 46 being constituted by said magnet 52 and a pair of pole pieces 47a, 47b which are disposed on the axial ends of the magnet 52. And disposed on the inner surface of a motor hub 41 is a sleeve 44 having an insertion hole 45 in which is fitted the shaft 46 which comprises the magnet 52 and pole pieces 47a, 47b. A magnetic fluid 51 is sealed in the clearance between the outer surface of the shaft 46 and the inner surface of the sleeve 44.

In such construction shown in FIG. 6, since the magnet 52 functions as a central shaft, the magnet 52 is required to have a substantial mechanical strength and a high dimensional accuracy. That is, the surface processing for generation of dynamic pressure in the magnetic fluid 51 has to be applied to the surface of the magnet 52; however, while it is necessary to use a magnet which has a substantial mechanical strength, such as Alnico magnet, neodymium magnet or the like, it is very difficult to apply high precision processing to the surfaces of these magnets as by cutting. Thus, the problem is that grinding or the like processing which leads to an increase in cost has to be applied.

Further, in the conventional dynamic pressure bearing device shown in FIG. 5, the sleeve 44 and shaft 46 are made of the same material, with the result that they expand with the same thermal expansion coefficient when subjected to changes in temperature; therefore, the clearances 50 and 48a, 48b will not so much change in width. However, since the viscosity of the magnetic fluid 51 is high at low temperatures and low at high temperatures, the dynamic pressure generated in the magnetic fluid 51 at high temperatures is low. Thus, there has been another problem that the bearing performances is degraded by changes in temperature due to the heat generated by the motor and the heat generated by agitation of the magnetic fluid 51.

SUMMARY OF THE INVENTION

This invention has been accomplished to eliminate the prior art drawbacks, and a first object thereof is to provide a dynamic pressure bearing device so designed that the surface processing for generation of dynamic pressure is easy and reduction in size can be attained. A second object is to provide a dynamic pressure bearing device capable of preventing the degradation of the bearing performance due to temperature changes.

A dynamic pressure bearing device in claim 1 comprises an axially magnetized shaft 1, a sleeve 5 having an axial hole 6 in which said shaft 1 is fitted, a hub 9 of magnetic material loosely fitted for relative rotation on the outer peripheral surface of said sleeve 5, and a pole piece 11a extending from the hub 9 to the vicinity of said shaft 1 so as to cover the end surface of said sleeve 5, wherein a journal bearing is formed between the outer periphery of the sleeve 5 and the inner periphery of the hub 9 and a magnetic fluid 15 is held in a magnetic path extending from said shaft 1 via the pole piece 11a, thereby sealing said bearing working fluid 15.

A dynamic pressure bearing device in claim 2 is characterized in that the thermal expansion coefficient of said sleeve 5 is greater than that of said hub 9.

A dynamic pressure bearing device in claim 3 is characterized in that said shaft 1 is composed of an axially magnetized magnet 4 and first and second shafts 2 and 3 of magnetic material disposed on the axially opposite sides of said magnet 4.

A dynamic pressure bearing device in claim 4 is characterized in that the outer diameter of said magnet 4 is smaller than that of the first and second shafts 2 and 3.

A dynamic pressure bearing device in claim 5 is characterized in that said shaft 1 is integrally formed of said axially magnetized magnet 4.

A dynamic pressure bearing device in claim 6 is characterized in that said bearing working fluid 15 is a magnet fluid 15, and a dynamic pressure bearing device in claim 7 is characterized in that a thrust bearing is formed between the end of said sleeve 3 and the lateral surface of said pole piece 11a.

In the dynamic pressure bearing device in claim 1, since the sleeve 5 is fixed on the outer periphery of the shaft 1, the processing of the surface of the sleeve 5 for generation of dynamic pressure is easier than in the case of applying processing to a magnet 4 of hardly machinable material. Further, axially magnetizing the shaft 1 while eliminating the magnet 4 which was conventionally disposed outside makes it possible for the magnetic circuit provided by the magnetic flux from the shaft 1 to retain the working oil to perform the bearing and sealing functions.

In the dynamic pressure bearing device in claim 2, since the thermal expansion coefficient of the sleeve 5 is greater than that of the hub 9, the sleeve 5 will thermally expand more than the hub 9 when the temperature increases. Therefore, the spacing between the sleeve 5 and the hub 9 is decreased, so that even if the viscosity of the bearing working fluid 15 is decreased at high temperatures, dynamic pressure easily tends to be generated in the bearing working fluid 15, the radial dynamic pressure being greater. Thus, degradation of the bearing performance due to temperature changes can be prevented.

Further, in the dynamic pressure bearing device in claim 3, since the shaft 1 is composed of the axially magnetized magnet 4 and the first and second shafts of magnetic material joined to the axially opposite sides of said magnet 4, the magnet 4, which was conventionally disposed outside, is disposed inside, making it possible to attain reduction in size.

In the dynamic pressure bearing device in claim 4, as it is prescribed that the outer diameter of the magnet 4 should be smaller than that of the first and second shafts 1 and 2, it is only necessary that the outer diameter of the magnet 4 be smaller than that of the first and second shafts and there is no need to apply precision processing to the magnet 4.

In the dynamic pressure bearing device in claim 5, since shaft 1 is constituted by the axially magnetized magnet 4, the construction of the shaft 1 is simplified and the shaft 1 has only to be inserted in the insertion hole in the sleeve 5, the high precision processing of the magnet becomes unnecessary.

The dynamic pressure bearing devices in claims 6 and 7 can be easily embodied with sufficient reliability. Particularly in the dynamic pressure bearing device in claim 7, degradation of the bearing performance of the thrust bearing due to temperature changes can be prevented.

DESCRIPTION OF THE PREFERRED EMBODIMENTS

Figure 1:
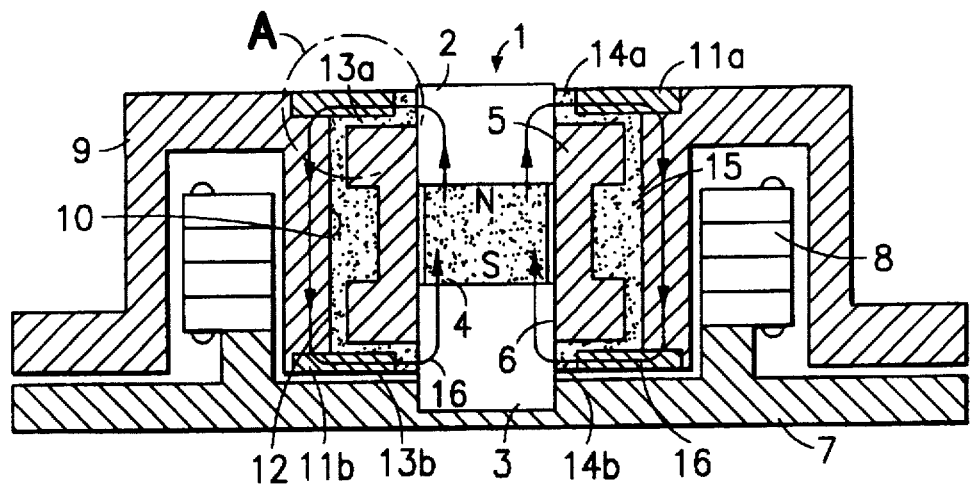
FIG. 1 is a sectional view of an embodiment of a dynamic pressure bearing device according to this invention.
Figure 2:
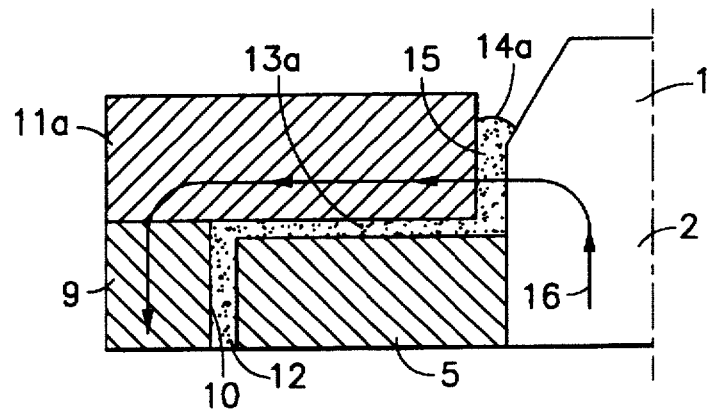
FIG. 2 is an enlarged sectional view of an area A in FIG. 1 of the embodiment of this invention.

Concrete embodiments of the dynamic pressure bearing of this invention will now be described in detail with reference to the drawings. FIG. 1 is a sectional view of an embodiment of a dynamic pressure bearing device according to this invention, and FIG. 2 is an enlarged sectional view of an area A in FIG. 1. In FIG. 1, the numeral 1 denotes a shaft comprising a first shaft 2, a second shaft 3, and a magnet 4. The cylindrical magnet 4 is axially magnetized, as shown. The first and second cylindrical shafts 2 and 3 are made of magnetic material. The magnet 4 is held between the shafts 2 and 3. The outer diameter of the magnet 4 is smaller than that of the shafts 2 and 3. The outer diameter of the magnet 4 is such that it provides a sufficient area from a magnetic point of view, and there is no need for precision processing. As for the material of the magnet 4, use is made of such strong magnets as samarium cobalt magnet, neodymium magnet and Alnico magnet, such strong magnets being magnetically sufficient, and their use makes it possible to reduce the area (of the axial end surface). Therefore, the outer diameter of the magnet 4 can be made smaller than that of the shafts 2 and 3.

The numeral 5 denotes a sleeve made of non-magnetic material, such as brass, having a greater thermal expansion coefficient than that of the hub 9. This sleeve 5 is substantially cylindrical and is axially formed with an insertion hole 6, in which said shaft 1 is press-fitted. And the shaft 1 composed of the shafts 2, 3 and magnet 4 is united with the sleeve 5 to provide the mechanical strength necessary for the central shaft. Further, the lower portion of the shaft 1 integral with the sleeve 5 is fixed to the base 7. In addition, the numeral 8 denotes a motor coil.

The motor hub 9 which is the rotating side is substantially cylindrical and made of magnetic material such as an iron type of magnetic material. The motor hub 9 is axially formed with a hole 10 greater than the outer diameter of the sleeve 5, with a pair of pole pieces 11a and 11b of magnetic material in the form of disks fixed to the upper and lower ends of said hole 10.

A clearance 12 is defined between the outer peripheral surface of the sleeve 5 and the inner peripheral surface of the hole 10 in the motor hub 9, and clearances 13a and 13b are defined between the lower and upper surfaces of the pole pieces 11a, 11b and the upper and lower surfaces of the sleeve 5, respectively. Further, clearances 14a and 14b are defined between the inner peripheral surfaces of the pole pieces 11a, 1b and the upper and lower regions of the shaft 1. These clearances 12, 13a, 13b, 14a, 14b are filled with a magnetic fluid serving as working oil.

The individual surfaces defining said clearances 12 and 13a, 13b, i.e., the inner peripheral surface of the hole 10, the outer peripheral surface of the sleeve 5, the lower surface of the upper pole piece 11a, the upper surface of the lower pole piece 11b, and the upper and lower surfaces of the sleeve 5 have applied thereto a surface processing which enables the rotation of the motor hub 9 to generate dynamic pressure in the magnetic fluid 15. That is, a journal bearing is defined by the outer peripheral surface of the sleeve 5 and the inner peripheral surface of the hole 10 in the motor hub 9, and a thrust bearing is defined by the upper and lower outer end surfaces of the sleeve 5 and the inner surfaces of the pole pieces 11a, 11b.

Further, said pole pieces 11a, 11b also define a sealing section. That is, since the magnet 4 forms a magnetic circuit extending successively through the first shaft 2, the upper pole piece 11a, motor hub 9, lower pole piece 11b, and second shaft 3, and returning to the magnet 4, magnetic fields are formed in the clearances 14a and 14b, thereby sealing the magnetic fluid 15 in the clearances 14a, 14b, such sealing function preventing leakage of the fluid in the clearances 12 and 13a, 13b.

In the above arrangement, when the motor hub 9 and the pole pieces 11a, 11b are rotated, a dynamic pressure is generated in the magnetic fluid 15 sealed in the clearances 12, 13a, 13b, said dynamic pressure acting on the inner peripheral surface of the hole 10 in the motor hub 9, sleeve 5, and pole pieces 11a, 11b. In this case, the radial load on the shaft 1 is supported by the sleeve 5 and the axial thrust load is supported by the sleeve 5 through the pole pieces 11a, 11b.

In the dynamic pressure bearing device in the embodiment described above, since the magnet 4 is integrated in the shaft 1, rather than positioned outside as in the prior art, to serve as the central shaft, the radial dimension of the present device can be reduced. Further, the surface processing for generation of dynamic pressure in the magnetic fluid 15 is applied not to the surface of the magnet 4 but to the outer peripheral surface of the sleeve 5 fixed on the outer periphery of the shaft 1; thus, the high precision processing is facilitated. The required tolerance and positional accuracy of the magnet 4 are of ordinary degree which is rational in the direction of the end surface (the direction of the axis) and there is no particular need for high precision. Tolerance for dynamic pressure bearings is only some microns, but in this embodiment, the respective shapes of the other parts are such that the required precision can be provided by an ordinary precision automatic lathe. And ordinary metallic materials and high molecular weight materials may be selected. Further, the surface processing of the bearing, such as grooving, for generating dynamic pressure in the bearing is facilitated in that the thrust load side (upper and lower surfaces of the sleeve 5) can be processed by pressing and the radial load side (outer peripheral surface of the sleeve 5) by rolling.

Further, since the thermal expansion coefficient of the sleeve 5 is greater than that of the hub 9, the sleeve 5 thermally expands more than the hub 9 as the temperature increases, so that the clearances 12 and 13a, 13b decrease in width. Since the bearing rigidity is reversely proportional to the third power of the bearing clearance, it is possible to minimize a decrease in the bearing rigidity produced in proportion to a decrease in the viscosity of the magnetic fluid 15 due to a temperature rise. For example, suppose a journal bearing in which the radius is 4.3 mm, the spacing of the clearance 12 is 6 μm and the viscosity η of the magnetic fluid 15 is 23 at a room temperature of 27° C. Then, the bearing rigidity of such bearing is 2.128 kg/μm by calculation. Suppose that the bearing increases in temperature by 30° C. Then, the viscosity η of the magnetic fluid 15 is 10 and if there is no change in the spacing of the clearance 12, the bearing rigidity is 0.925 kg/μm. This is a decrease of 56.6% of the value at the room temperature. Suppose the case in which the sleeve 5 is of brass and the hub 9 is of iron type material, as in the embodiment. Then, as a result of said temperature rise of 30° C., the spacing of the clearance 12 decreases by 0.8 μm and hence the bearing rigidity is calculated to be 1.421 kg/μm. At this time, the decrease in the rigidity is 33.2% of the value at the room temperature, and the decrease in the bearing rigidity due to the decrease in the viscosity of the magnetic fluid 15 is kept small by the thermal expansion coefficient of the sleeve 5 being greater than that of the hub 9.

In addition, if brass or the like which is softer than iron type materials is used as a material for the sleeve 5, as in the above embodiment, then the grooving for generation of dynamic pressure can further be facilitated.

(EMBODIMENT 2)

Figure 3:
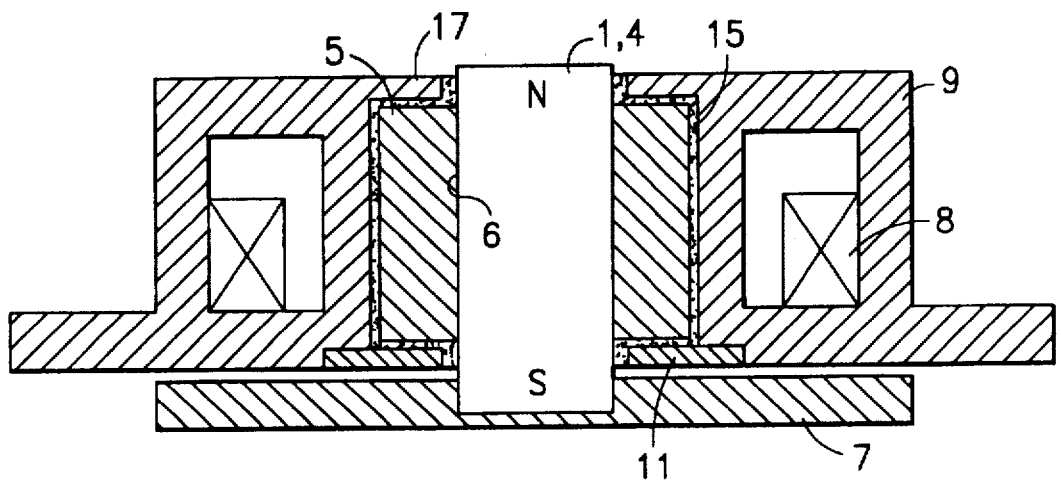
FIG. 3 is a sectional view of an embodiment 2 of a dynamic pressure bearing device according to this invention.

FIG. 3 shows an embodiment 2, wherein the shaft is integrally made of a magnet and said shaft is press-fitted in an insertion hole 6 in a sleeve 5 similar to the one used in the preceding embodiment. Further, in the present embodiment, the motor hub 9 is made of magnetic material and a pole piece 11 is disposed only in the lower portion of the motor hub 9. In the location corresponding to the upper surface of the sleeve 5, a magnetic pole piece 17 projects from the inner side of the upper portion of the motor hub 9, said magnetic pole piece having the function of said pole piece. In addition, the rest of the arrangement and the surface processing of the outer peripheral surface of the sleeve 5 and the like for generation of dynamic pressure in the magnetic fluid 15 are the same as in the preceding embodiment, and hence a description thereof is omitted.

Figure 4:
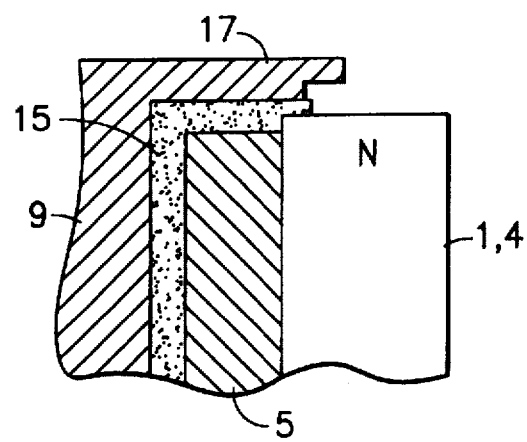
FIG. 4 is a principal sectional view of another embodiment of this invention.
Figure 5:
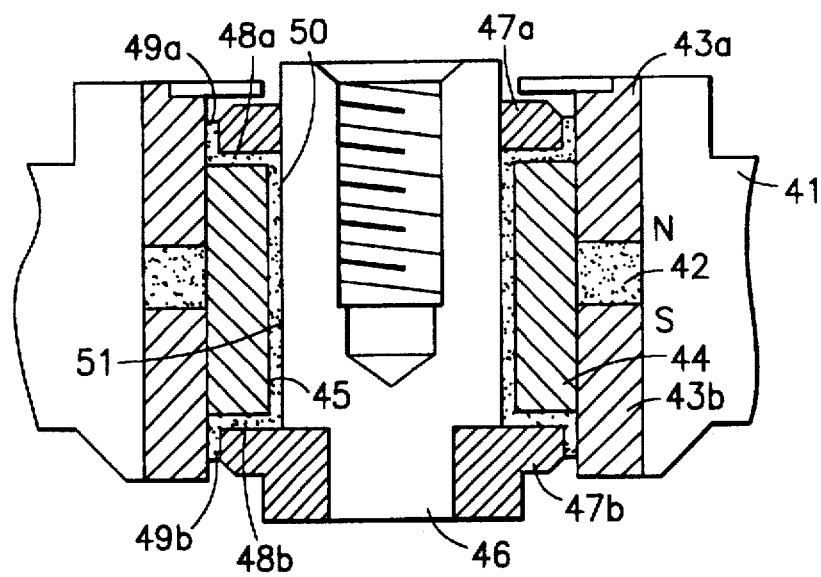
FIG. 5 is a sectional view of conventional dynamic pressure bearing device.
Figure 6:
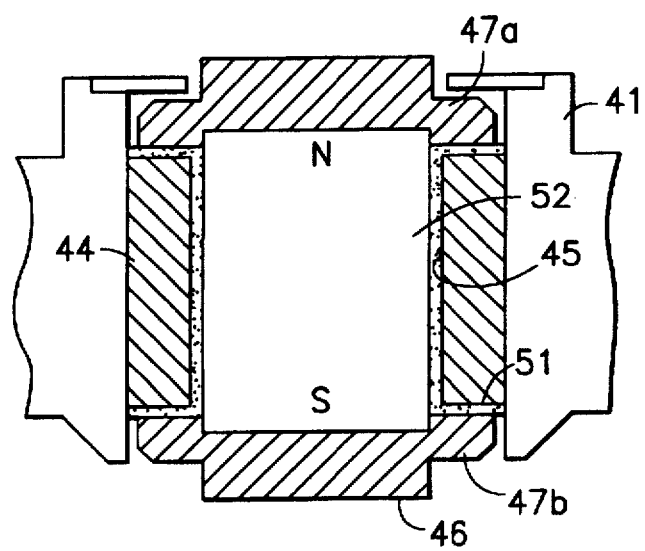
FIG. 6 is a principal sectional view of another conventional dynamic pressure bearing device.

In the embodiment shown in FIG. 3, the shaft 1 projects beyond the magnetic pole piece 17 formed in the motor hub 9, there may occur a case in which sufficient magnetic flux density cannot be obtained to seal the magnetic fluid between the magnetic pole piece 17 and the lateral surface of the shaft 1. In such case, sufficient magnetic flux density to seal the magnetic fluid 15 can be obtained by forming the magnetic pole piece 17 until it lies above the end surface of the shaft 1, as shown in FIG. 4.

In each of the above embodiments, the description has been given by the use of a magnetic fluid 15 sealed as working oil between the inner surface of the motor sleeve 9 and the outer surface of the sleeve 5; however, magnetic fluid may be used only in the location (between the pole piece and the shaft) where the fluid is sealed and oil may be used in the other locations where the dynamic pressure for the bearing is generated. Practically, however, the use of magnetic fluid 15 alone improves reliability. Further, in each of the above embodiments, the description has been given with reference to the case where the opposite ends of the shaft are sealed; however, the present invention is also applicable to a dynamic pressure bearing device of the construction in which one end alone is sealed. Further, the invention is not limited to the case where the shaft is fixed; the invention is also applicable to a dynamic pressure bearing device of the construction in which the shaft is rotated. Further, in the above embodiments, the whole of the sleeve 5 is made of a non-magnetic material whose thermal expansion coefficient is greater than that of the hub 9; however, the sleeve 5 may be made of a non-magnetic material whose thermal expansion coefficient is equal to that of the hub 9 and may be integrally formed at its outer peripheral surface with a coating material whose thermal expansion coefficient is greater than that of the hub 9.

As has so far been described, in the dynamic pressure bearing device in claim 1, since the sleeve is fixed on the outer periphery of the shaft, the surface processing of the sleeve for generation of dynamic pressure is facilitated as compared with the case of applying the processing to a magnet which is hard to process. Further, since a magnetic circuit is formed by axially magnetizing the shaft while eliminating the conventionally externally disposed magnet, it is possible to attain a reduction in size in the radial direction.

In the dynamic pressure bearing device in claim 2, since the thermal expansion coefficient of the sleeve is greater than that of the hub, the sleeve 5 will thermally expand more than the hub when the temperature increases. Therefore, the spacing between the sleeve and the hub is decreased, so that even if the viscosity of the bearing working fluid is decreased at high temperatures, dynamic pressure easily tends to be generated in the bearing working fluid 15, the radial dynamic pressure being greater. Thus, degradation of the bearing performance due to temperature changes can be prevented.

Further, in the dynamic pressure bearing device in claim 3, since the shaft is composed of the axially magnetized magnet and the first and second shafts of magnetic material joined to the axially opposite sides of said magnet, the magnet, which was conventionally disposed outside, is disposed inside, making it possible to attain reduction in size. Further, elimination of the conventional cylindrical member reduces the number of parts.

In the dynamic pressure bearing device in claim 4, as it is prescribed that the outer diameter of the magnet should be smaller than that of the first and second shafts 1 and 2, it is only necessary that the outer diameter of the magnet be smaller than that of the first and second shafts and there is no need to apply precision processing to the magnet.

In the dynamic pressure bearing device in claim 5, since the shaft is constituted by the axially magnetized magnet, the construction of the shaft is simplified and the shaft has only to be inserted in the insertion hole in the sleeve, the high precision processing of the magnet becomes unnecessary.

The dynamic pressure bearing devices in claims 6 and 7 can be easily embodied with sufficient reliability. Particularly in the dynamic pressure bearing device in claim 7, degradation of the bearing performance of the thrust bearing due to temperature changes can be prevented.

What is claimed is:

1. A dynamic pressure bearing device comprising:

an axially magnetized shaft, a sleeve of nonmagnetic material having an axial hole in which said shaft is fitted, a hub of magnetic material loosely fitted for relative rotation on an outer peripheral surface of said sleeve, a pole piece extending from said hub to the vicinity of said shaft so as to cover an end surface of said sleeve, wherein a journal bearing is formed between said outer periphery of said sleeve and an inner periphery of said hub and a bearing working fluid being held in a magnetic flux path extending between said shaft and said hub via said pole piece, thereby sealing said bearing working fluid, and said magnetic flux path passing from said shaft through said pole piece into said magnetic hub and passing from said magnetic hub through said pole piece back into said shaft such that the magnetic flux surrounds said sleeve.

2. A dynamic pressure bearing device according to claim 1, wherein:

a thermal expansion coefficient of said sleeve is greater than that of said hub.

3. A dynamic pressure bearing device according to claim 1, wherein:

said shaft includes an axially magnetized magnet and first and second shafts of magnetic material disposed on axially opposite sides of said magnet.

4. A dynamic pressure bearing device according to claim 3, wherein:

an outer diameter of said magnet is smaller than an outer diameter of said first shaft and an outer diameter of said second shaft.

5. A dynamic pressure bearing device according to claim 1, wherein:

said axially magnetized shaft is an axially magnetized magnet.

6. A dynamic pressure bearing device according to claim 1, wherein:

said bearing working fluid is a magnetic fluid.

7. A dynamic pressure bearing device according to claim 1, wherein:

a thrust bearing is formed between said end surface of said sleeve and a lateral surface of said pole piece.

* * * * *